United States Patent
Scheepens et al.

(10) Patent No.: US 12,190,142 B2
(45) Date of Patent: Jan. 7, 2025

(54) VISUAL CONFORMANCE CHECKING OF PROCESSES

(71) Applicant: UiPath, Inc., New York, NY (US)

(72) Inventors: Roeland Johannus Scheepens, Eindhoven (NL); Bart Martinus Cornelis De Bie, Eindhoven (NL)

(73) Assignee: UiPath, Inc., New York, NY (US)

( * ) Notice: Subject to any disclaimer, the term of this patent is extended or adjusted under 35 U.S.C. 154(b) by 26 days.

(21) Appl. No.: 16/730,700

(22) Filed: Dec. 30, 2019

(65) Prior Publication Data

US 2021/0200574 A1    Jul. 1, 2021
US 2022/0318048 A2    Oct. 6, 2022

(51) Int. Cl.
*G06F 9/46*     (2006.01)
*G06F 9/48*     (2006.01)

(52) U.S. Cl.
CPC ............ *G06F 9/463* (2013.01); *G06F 9/4881* (2013.01)

(58) Field of Classification Search
CPC ................................ G06F 9/463; G06F 9/4881
See application file for complete search history.

(56) References Cited

U.S. PATENT DOCUMENTS

| | | | | |
|---|---|---|---|---|
| 5,870,545 A | * | 2/1999 | Davis | G06F 9/5038 709/201 |
| 6,304,912 B1 | * | 10/2001 | Oguchi | H04L 12/5601 370/351 |
| 6,415,396 B1 | * | 7/2002 | Singh | G06F 11/3688 714/33 |
| 6,594,698 B1 | * | 7/2003 | Chow | G06F 9/5011 709/219 |
| 6,651,246 B1 | * | 11/2003 | Archambault | G06F 8/443 717/160 |
| 6,901,048 B1 | * | 5/2005 | Wang | H04L 45/02 370/216 |
| 7,543,020 B2 | * | 6/2009 | Walker | G06F 15/173 709/203 |
| 9,530,113 B2 | | 12/2016 | Charif et al. | |
| 9,973,442 B1 | * | 5/2018 | Kim | H04L 49/101 |
| 2004/0107414 A1 | * | 6/2004 | Bronicki | G06F 8/34 717/105 |
| 2004/0260590 A1 | * | 12/2004 | Golani | G06Q 10/10 705/7.26 |
| 2005/0278301 A1 | * | 12/2005 | Castellanos | G06F 30/20 |

(Continued)

OTHER PUBLICATIONS

Rozinat et al. "Conformance checking of processes based on monitoring real behavior". Information Systems. Elsevier. (Year: 2008).*

(Continued)

*Primary Examiner* — Adam Lee
(74) *Attorney, Agent, or Firm* — Chiesa Shahinian & Giantomasi PC (57) ABSTRACT

Systems and methods for determining conformance of a process based on a process model of the process and an event log of an execution of the process are provided. The process model is divided into one or more control regions and reachable nodes are determined for each node in the process model. Conformance of the process is determined by comparing transitions from source activities to destination activities in the event log with the reachable nodes based on the one or more control regions.

20 Claims, 11 Drawing Sheets
(1 of 11 Drawing Sheet(s) Filed in Color)

(56) References Cited

U.S. PATENT DOCUMENTS

| | | | | |
|---|---|---|---|---|
| 2006/0293934 | A1* | 12/2006 | Tsyganskiy | G06F 8/34 705/7.29 |
| 2007/0033582 | A1* | 2/2007 | Hu | G06F 8/10 717/136 |
| 2009/0144411 | A1* | 6/2009 | Winkler | H04L 67/18 709/224 |
| 2010/0005513 | A1* | 1/2010 | Bradley | G06Q 20/1235 726/4 |
| 2010/0094981 | A1* | 4/2010 | Cordray | H04L 41/082 709/222 |
| 2011/0016441 | A1* | 1/2011 | Baumgartner | G06F 30/3323 716/107 |
| 2012/0066662 | A1* | 3/2012 | Chao | G06F 8/10 717/104 |
| 2012/0089869 | A1* | 4/2012 | Cohen | G06F 11/3676 714/E11.029 |
| 2012/0197677 | A1* | 8/2012 | Bhamidipaty | G06Q 10/06311 705/7.13 |
| 2013/0035976 | A1* | 2/2013 | Buffett | G06F 11/00 705/7.26 |
| 2013/0097320 | A1* | 4/2013 | Ritter | G06Q 10/06 709/226 |
| 2014/0047445 | A1* | 2/2014 | Roy | G06F 9/46 718/100 |
| 2014/0058789 | A1 | 2/2014 | Doehring et al. | |
| 2014/0164379 | A1* | 6/2014 | Jojgov | G06F 16/285 707/737 |
| 2014/0172914 | A1* | 6/2014 | Elnikety | G06F 16/9024 707/774 |
| 2014/0379716 | A1* | 12/2014 | Branch | G06F 8/76 707/738 |
| 2015/0066816 | A1 | 3/2015 | Charif et al. | |
| 2015/0095093 | A1* | 4/2015 | Chan | G06Q 10/06316 705/7.26 |
| 2015/0095257 | A1* | 4/2015 | Chan | G06Q 10/06316 705/348 |
| 2015/0213373 | A1* | 7/2015 | Li | G06N 7/005 706/52 |
| 2015/0294231 | A1 | 10/2015 | Li et al. | |
| 2015/0379008 | A1* | 12/2015 | Reiss | G06F 16/2358 707/693 |
| 2016/0085584 | A1* | 3/2016 | Pedersen | G06F 9/4843 718/102 |
| 2016/0147548 | A1* | 5/2016 | Itsumi | H04L 67/101 718/1 |
| 2016/0307142 | A1* | 10/2016 | Prabhakara | G06V 20/52 |
| 2016/0371132 | A1* | 12/2016 | Prabhakara | G06F 11/0787 |
| 2017/0300701 | A1* | 10/2017 | Ponta | G06F 21/6218 |
| 2018/0225189 | A1* | 8/2018 | Putra | G06F 16/1734 |
| 2018/0332443 | A1* | 11/2018 | Novo Diaz | H04W 4/08 |
| 2019/0164091 | A1* | 5/2019 | Schnittger | G06Q 10/0633 |
| 2020/0026263 | A1* | 1/2020 | Haberkern | H04L 41/5022 |
| 2020/0396231 | A1 | 12/2020 | Krebs et al. | |
| 2021/0004711 | A1* | 1/2021 | Gupta | G06N 5/003 |
| 2021/0216925 | A1* | 7/2021 | Dixit | G16H 40/20 |

OTHER PUBLICATIONS

Estanol et al. "Conformance checking in UML artifact-centric business process models". Software & Systems Modeling 18:2531-2555. (Year: 2019).*

Dixit et al. "Enabling interactive process analysis with process mining and visual analytics". Proceedings of the 10th International Joint Conference on Biomedical Engineering Systems and Technologies. (Year: 2017).*

Basole et al. "A Visual Analytics Approach to Understanding Care Process Variation and Conformance". VAHC '15. (Year: 2015).*

Caballero et al. "Visual Analytics for Evaluating Clinical Pathways". IEEE Workshop on Visual Analytics in Healthcare. (Year: 2017).*

Leemans et al. "Directly Follows-Based Process Mining: Exploration & a Case Study". International Conference on Process Mining (ICPM). (Year: 2019).*

Leemans et al. "Directly Follows-Based Process Mining: a Tool". Proceedings of the ICPM Demo Track 2019 (CEUR Workshop Proceedings, vol. 2374). (Year: 2019).*

Van Der Aalst et al. "Conformance Checking of Service Behavior". ACM Transactions on Internet Technology, vol. 8, No. 3, Article 13. (Year: 2008).*

Thomas Chatain, Josep Carmona. Anti-Alignments in Conformance Checking—The Dark Side of Process Models. 37th International Conference on Applications and Theory of Petri Nets (Petri Nets 2016), Torún, Poland. pp. 240-258. (Year: 2017).*

Constant, Camille et al. "Integrating Formal Verification and Conformance Testing for Reactive Systems". IEEE Transactions on Software Engineering. vol. 33, No. 8. (Year: 2007).*

Burattin, A .; Carmona, J. A framework for online conformance checking. A: International Workshop on Business Process Intelligence. "Business Process Management Workshops, BPM 2017 International Workshops: Barcelona, Spain: revised papers". Berlín: Springer, p. 165-177. (Year: 2017).*

Hull, Richard et al. "Business Process Management". 8th International Conference, BPM Hoboken, NJ, USA, Proceedings. (Year: 2010).*

Woehrle, Matthias et al. "Conformance Testing for Cyber-Physical Systems". ACM Transactions on Embedded Computing Systems , vol. 11, No. 4, Article 84. (Year: 2012).*

Hendrik Roehm, Jens Oehlerking, Matthias Woehrle, and Matthias Althoff. 2019. Model Conformance for Cyber-Physical Systems: A Survey. ACM Trans. Cyber-Phys. Syst. 3, 3, Article 30, 26 pages. (Year: 2019).*

Reissner, Daniel et al. "Scalable Conformance Checking of Business Processes". Queensland University of Technology, Australia. University of Tartu, Estonia. (Year: 2017).*

Pascalau et al. "Partial Process Models to Manage Business Process Variants". Int. J. Business Process Integration and Management. (Year: 2011).*

Qi, HongDa et al. "An approach to repair Petri net-based process models with choice structures". Enterprise Information Systems. (Year: 2018).*

Adriansyah et al. "Conformance Checking using Cost-Based Fitness Analysis" IEEE International Enterprise Distributed Object Computing Conference. (Year: 2011).*

Garcia-Banuelos, Luciano et al. "Complete and Interpretable Conformance Checking of Business Processes". IEEE Transactions On Software Engineering, vol. 44, No. 3. (Year: 2018).*

Molka, Thomas et al. "Conformance Checking for BPMN-Based Process Models". ACM. (Year: 2014).*

Leemans et al., "Exploring Processes and Deviations," Springer International Publishing Switzerland (2015), F. Fournier and J. Mendling (Eds.): BPM 2014 Workshops, LNBIP 202, pp. 304-316.

Thao et al., "Compliance Monitoring in Business Processes: Functionalities, Application, and Tool-Support," Information Systems (2015), vol. 54, Dec. 2015, pp. 209-234.

Garcia-Bañuelos et al., "Complete and Interpretable Conformance Checking of Business Processes," IEEE Transactions on Software Engineering, vol. 44, No. 3, Mar. 2018, pp. 262-290.

Munoz-Gama et al., "Conformance Checking in the Large: Partitioning and Topology," (2013) Daniel F., Wang J., Weber B. (eds) Business Process Management, 16 pgs.

Adriansyah et al., "Conformance Checking using Cost-Based Fitness Analysis," 2011, 15th IEEE International Enterprise Distributed Object Computing Conference, pp. 55-64.

Van Dongen, "Efficiently Computing Alignments: Algorithm and Datastructures," Business Process Management Workshops (2019), pp. 44-55.

Vanden Broucke S.K.L.M et al., "Event-Based Real-Time Decomposed Conformance Analysis," Meersman R et al. (eds) On the Move to Meaningful Internet Systems (OTM) 2014 Conferences, 19 pgs.

Munoz-Gama et al., "Hierarchical Conformance Checking of Process Models Based on Event Logs," Colom JM., Desel J. (eds) Application and Theory of Petri Nets and Concurrency 2013, 20 pgs.

(56) References Cited

OTHER PUBLICATIONS

Weidlich et al., "Process Compliance Analysis Based on Behavioural Profile," Information Systems, vol. 36, Issue 7, Nov. 2011, 43 pgs.
Kalenkova et al., "Process Mining Using BPMN: Relating Event Logs and Process Models," Software & Systems Modeling vol. 16 (2017), pp. 1019-1048.
Lee et al., "Recomposing Conformance: Closing the Circle on Decomposed Alignment-Based Conformance Checking In Process Mining," Information Sciences, vol. 466, Oct. 2018, pp. 55-91.
Munoz-Gama et al., "Single-Entry Single-Exit Decomposed Conformance Checking," Information Systems, vol. 46, Dec. 2014, pp. 102-122.
Song et al., "Efficient Alignment Between Event Logs and Process Models," IEEE Transactions on Services Computing, vol. 10, No. 1, Jan.-Feb. 2017, pp. 136-149.
Mannhardt et al., "Balanced Multi-Perspective Checking of Process Conformance," Computing. Archives for Informatics and Numerical Computation, vol. 98, Issue 4, Apr. 2016, pp. 407-437.
Adriansyah et al., "Memory-Efficient Alignment of Observed and Modeled Behavior," Business Process Management reports, vol. 1303, 2013, 44 pgs.
Dumas et al., "Process Mining Reloaded: Event Structures as a Unified Representation of Process Models and Event Logs," Application and Theory of Petri Nets and Concurrency, 2015, 16 pgs.
Rozinat, "Process Mining: Conformance and Extension," Beta dissertation, vol. 136, 2010, 406 pgs.
De Leoni et al., "Aligning Event Logs and Process Models for Multi-Perspective Conformance Checking: An Approach Based on Integer Linear Programming," Business Process Management, 2013, 19 pgs.
Adriansyah, "Aligning Observed and Modeled Behavior," Technische Universiteit Eindhoven, 2014, 263 pgs.
Rozinat et al., "Conformance Testing: Measuring the Fit and Appropriateness of Event Logs and Process Models," Business Process Management Workshops, 2005, pp. 163-176.
Rozinat et al., "Conformance Checking of Processes Based on Monitoring Real Behavior," Information Systems, vol. 33, 2008, pp. 64-95.
Van der Aalst, "8.4 Comparing Footprints," Data Science in Action (book), Apr. 2016, pp. 263-267.
Matthias et al., "Propagating changes between aligned process models", Journal of Systems and Software, vol. 85, Issue 8, 2012, pp. 1885-1898.
Final Office Action mailed Jul. 25, 2024 in connection with U.S. Appl. No. 17/456,891, filed Nov. 30, 2021, 15 pgs.

* cited by examiner

Perform conformance checking on a process
202

Visualize results of the conformance checking
performed on the process
204

VISUAL CONFORMANCE CHECKING OF PROCESSES

TECHNICAL FIELD

The present invention relates generally to process mining, and more particularly to visual conformance checking of processes.

BACKGROUND

In process mining, processes are analyzed to identify trends, patterns, and other process analytical measures in order to improve efficiency and gain a better understanding of the processes. One process mining technique is conformance checking, which is performed to evaluate whether the actual execution of a process conforms to the expected execution of the process. In particular, conformance checking involves comparing data from an event log representing the actual execution of the process with a process model representing the expected execution of the process. Conventional conformance checking techniques provide results that are difficult to interpret for users in a business context. In addition, such conventional conformance checking techniques identify a number and a location of deviations of the actual execution of the process from the expected execution of the process, but do not provide diagnostic information that allows a user to understand the deviations.

BRIEF SUMMARY OF THE INVENTION

In accordance with one or more embodiments, systems and methods for determining conformance of a process based on a process model of the process and an event log of an execution of the process are provided. The process may be a robotic process automation process.

The process model is divided into one or more control regions and reachable nodes are determined for each node in the process model. Conformance of the process is determined by comparing transitions from source activities to destination activities in the event log with the reachable nodes based on the one or more control regions.

In one embodiment, a transition from a source activity to a destination activity is determined to be conforming where the destination activity is reachable from the source activity. A transition from a source activity to a destination activity is determined to be nonconforming where a control region of the source activity and a control region of the destination activity have an exclusive relationship. Where source activity and a destination activity have no direct relationship and the control regions of the source activity and the destination activity have a concurrent relationship, a transition from a last activity executed in a control region of a destination activity to the destination activity is determined to be conforming where the destination activity is reachable from the last activity executed in the control region of the destination activity. For a transition from a source activity to a destination activity where no activity is executed in a control region of the destination activity and the destination activity is a first activity in the control region, the transition is determined to be conforming where the destination activity is reachable from an entry gateway of the control region of the destination activity.

In one embodiment, the process model models the process using parallel and/or exclusive gateways to represent diversions in the process.

These and other advantages of the invention will be apparent to those of ordinary skill in the art by reference to the following detailed description and the accompanying drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

In process mining, conformance checking is performed to evaluate whether the actual execution of a process conforms to the expected execution of the process. In accordance with embodiments of the present invention, conformance checking is performed by comparing transitions between events in an event log of a process with dependencies between activities in a process model of the process to thereby determine the conformance of the transitions. Advantageously, embodiments of the present invention provide for conformance checking with a lower computational complexity than conventional conformance checking techniques, while also providing an output that can be intuitively visualized for a user in a business setting.

Figure 1:
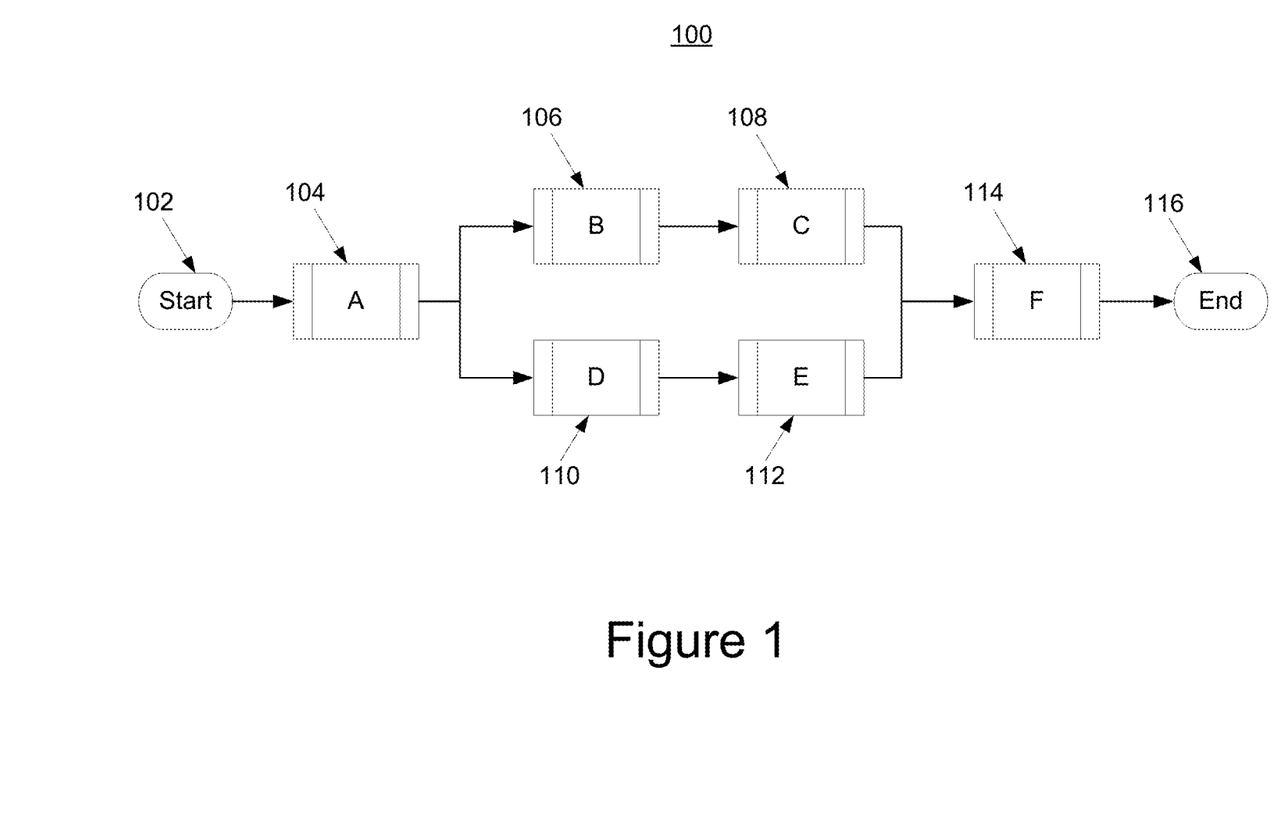
FIG. 1 shows an illustrative process on which conformance checking may be performed in accordance with one or more embodiments of the invention.

FIG. 1 shows an illustrative process 100 on which conformance checking may be performed in accordance with one or more embodiments. Process 100 may be applied to perform any suitable task, such as, e.g., document processing. In one embodiment, process 100 may be implemented as a robotic process automation (RPA) workflow for automatically performing a task using RPA robots. However, it should be understood that process 100 may be any suitable well-structured process that can be modelled as a workflow, such as, e.g., a business workflow. A well-structured process is a process having a single entry and single exit sequence of flows.

Process 100 comprises activities 102-116, which represent predefined steps in process 100. As shown in FIG. 1, process 100 is modeled as a directed graph where each activity 102-116 is represented as a node and each transition between activities 102-116 is represented as edges linking the nodes. The transition between activities represents the execution of process 100 from a source activity to a destination activity. Process 100 starts at start activity 102 and proceeds to activity A 104. Process 100 then proceeds, in parallel, to a first branch comprising activity B 106 and activity C 108 and a second branch comprising activity D 110 and activity E 112. Process 100 then proceeds to activity F 114 and ends at end activity 116. During execution of process 100, events are recorded in an event log. An event refers to the execution of an activity for a certain case at a certain point in time. The event may be represented as a tuple comprising an activity, a case identifier, and a time stamp.

Figure 2:
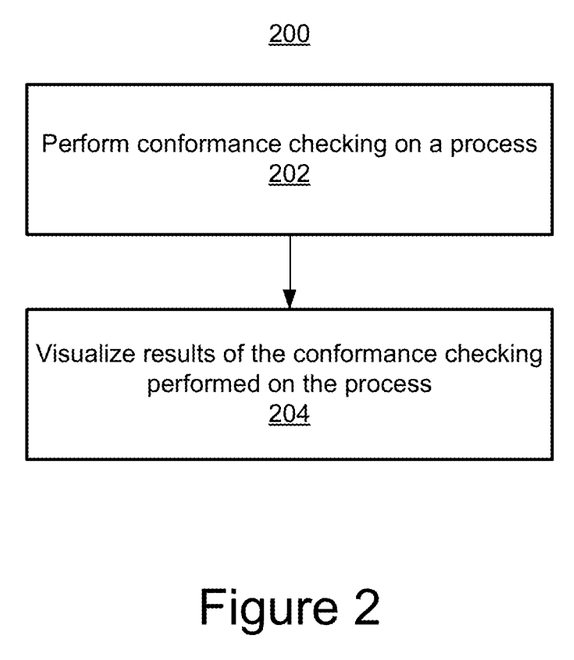
FIG. 2 shows a method for visualizing conformance checking of a process, in accordance with one or more embodiments of the invention.

FIG. 2 shows a method 200 for visualizing conformance checking of a process, in accordance with one or more embodiments. Method 200 may be performed by any suitable computing device, such as computer 1100 of FIG. 11. At step 202, conformance checking is performed on a process (e.g., process 100 of FIG. 1). In one embodiment, step 202 may be performed according to the steps of method 300 of FIG. 3, described in detail below. At step 204, results of the conformance checking performed on the process are visualized. Visualization of results of the conformance checking is discussed in further detail below with respect to FIGS. 7-10.

Figure 3:
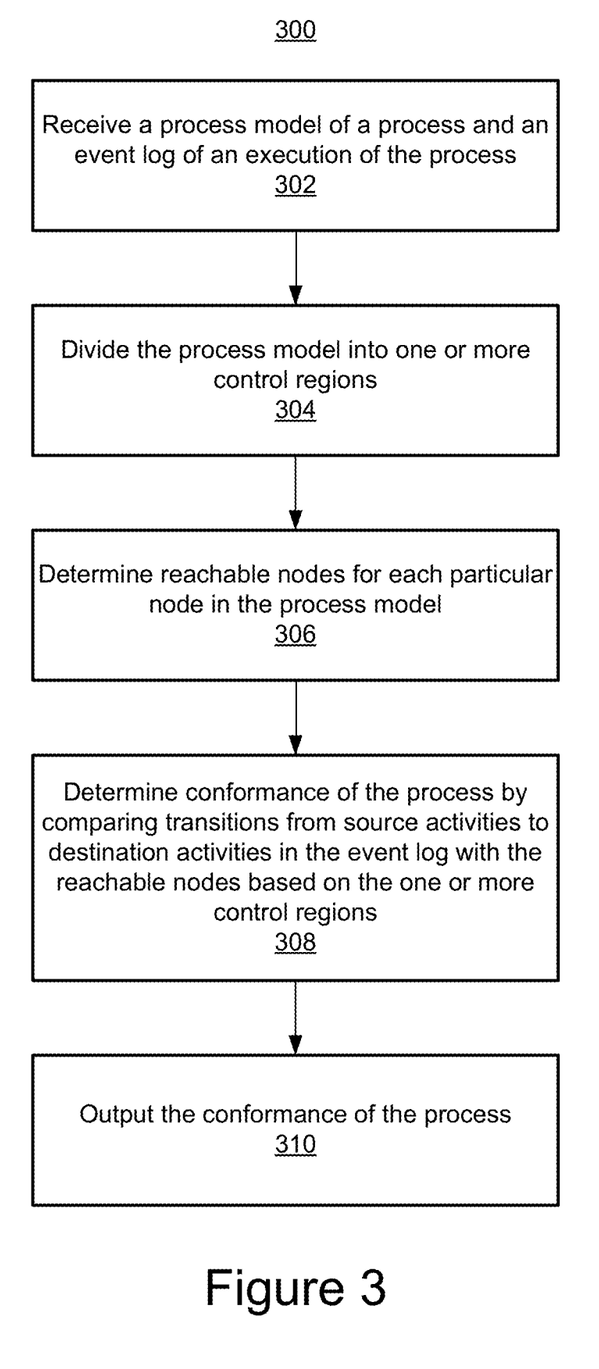
FIG. 3 shows a method for performing conformance checking on a process, in accordance with one or more embodiments of the invention.

FIG. 3 shows a method 300 for performing conformance checking on a process, in accordance with one or more embodiments. Method 300 may be performed by any suitable computing device, such as computer 1100 of FIG. 11. In one embodiment, the steps of method 300 may be performed at step 202 of FIG. 2.

At step 302, a process model of a process and an event log of an execution of the process are received. The process model is a model representing an expected execution of the process. The event log is a log recording events of the actual execution of the process. An exemplary process model is shown in FIG. 4 and an exemplary event log is shown in FIG. 5, both of which are described in detail below.

Figure 4:
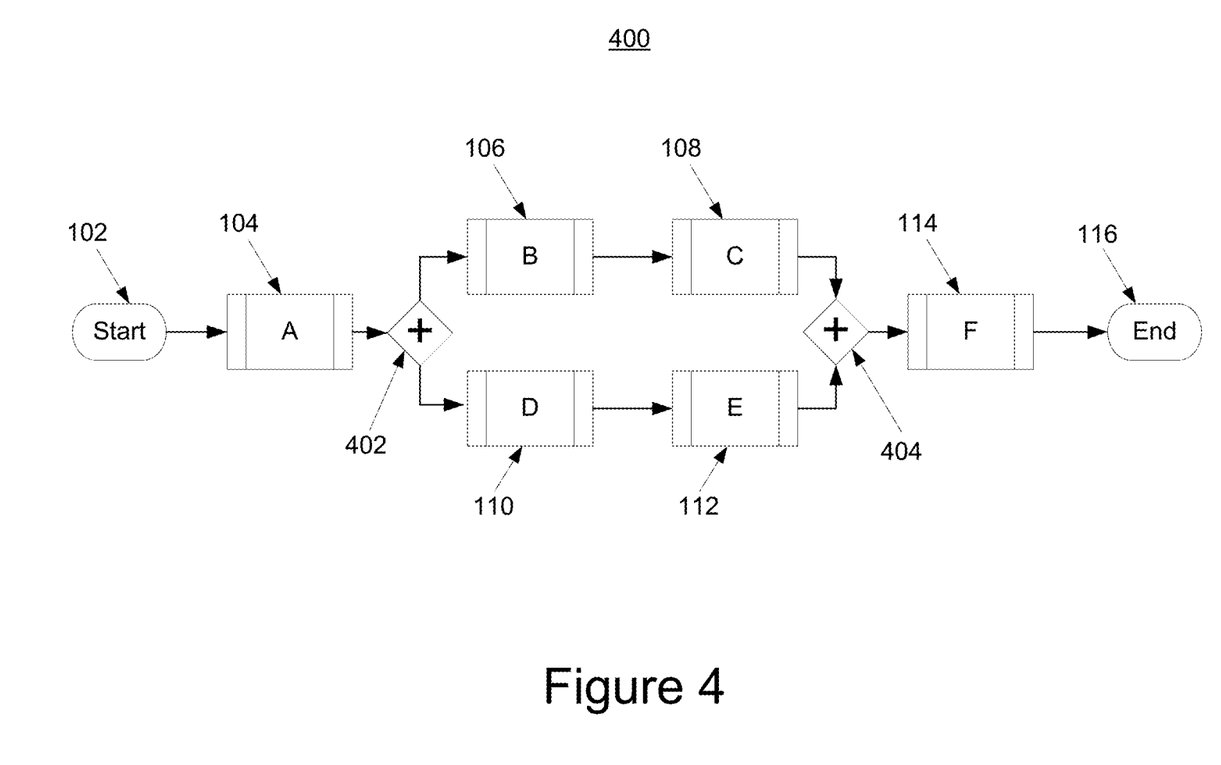
FIG. 4 shows an exemplary process model, in accordance with one or more embodiments of the invention.
Figure 5:
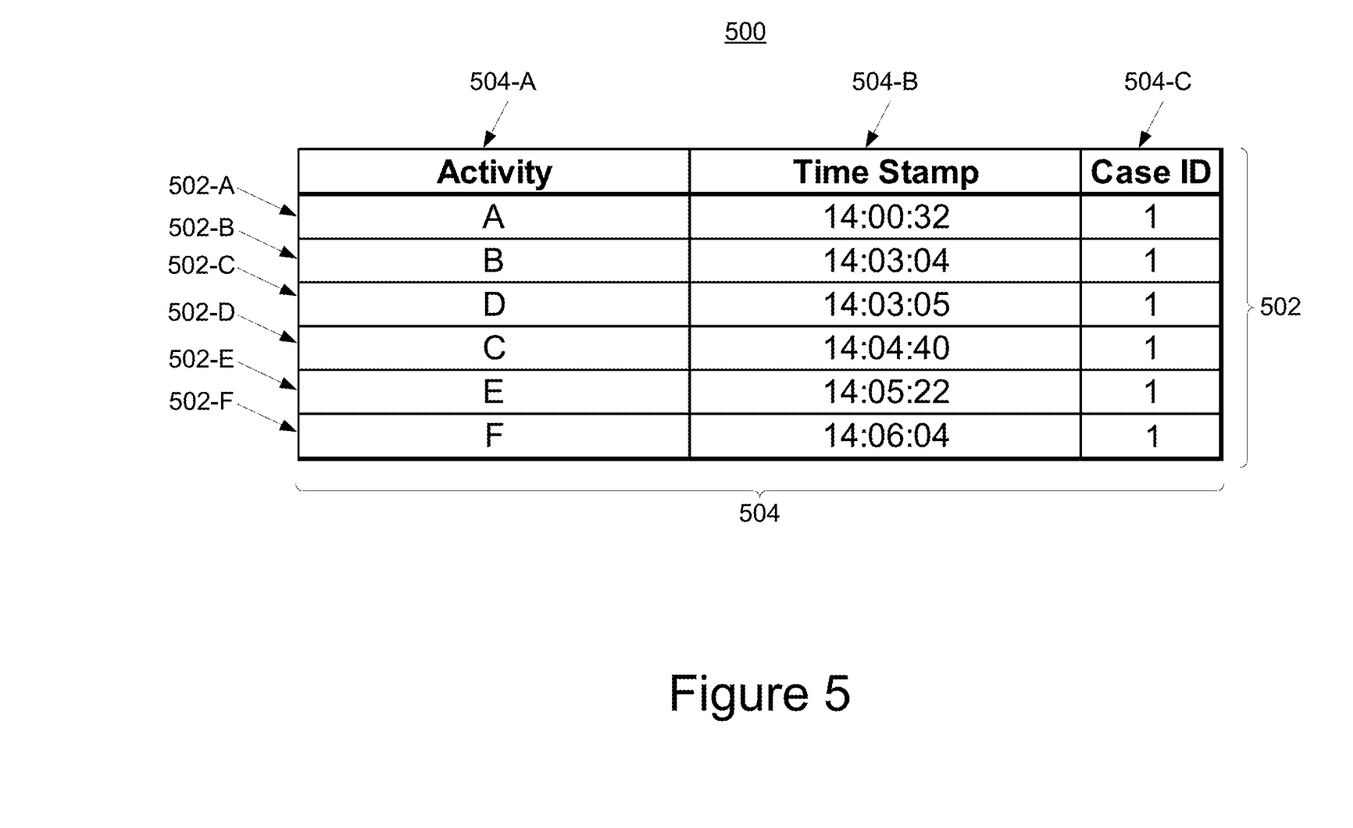
FIG. 5 shows an exemplary event log of a process, in accordance with one or more embodiments of the invention.

FIG. 4 shows an exemplary process model 400, in accordance with one or more embodiments. Process model 400 may be the process model received at step 302 of FIG. 3. Process model 400 is the process model of process 100 of FIG. 1 and will be shown and described herein with reference to FIG. 1. Process model 400 is modeled using BPMN (business process model and notation), however it should be understood that process model 400 may be modeled using any other suitable notation that can represent exclusive choices and parallelism, such as, e.g., Petri nets or process trees.

In one embodiment, process model 400 models process 100 using gateways to represent diversions in process 100. The gateways control how the process flows during execution. The gateways may be exclusive gateways or parallel gateways and may split a single path into multiple paths or join multiple paths into a single path. For an exclusive gateway, a single output path (for split gateways) or a single input path (for join gateways) is traversed during execution of the process. For a parallel gateway, multiple output paths (for split gateways) or multiple input paths (for join gateways) are concurrently traversed during execution of the process. As shown in FIG. 4, parallel split gateway 402 represents splitting of the path from activity A 104 into a first path to activity B 106 and a second path to activity D 110 to concurrently execute activity B 106 and activity D 110, and parallel join gateway 404 represents the joining of a first path from activity C 108 and a concurrent second path from activity E 112 into a single path to activity F 114.

In one embodiment, process model 400 is a well-structured process model having a single entry and single exit sequence of flows.

FIG. 5 shows an exemplary event log 500 of a process, in accordance with one or more embodiments. Event log 500 may be the event log received at step 302 of FIG. 3. Event log 500 is the event log recording execution of process 100 of FIG. 1 and will be shown and described with reference to FIGS. 1 and 4. Event log 500 is formatted as a table having rows 502 and columns 504. As shown in FIG. 5, rows 502 of event log 500 comprises rows 502-A through 502-F, each corresponding to an event defining execution of a respective activity 104-114, with a particular time stamp and with a particular case identifier. Event log 500 may also include rows 502 for start activity 102 and end activity 116 in some embodiments. Columns 504 of event log 500 comprises column 504-A identifying the activity, column 504-B identifying the time stamp, and column 504-C identifying the case identifier. Columns 504 may include additional columns identifying additional attributes of activities.

At step 304 of FIG. 3, the process model is divided into one or more control regions. A control region is a region of the process model that has a single entry node, a single exit node, and a set of (possibly empty) interior nodes, wherein the entry node is a gateway node or a start node, the exit node is a gateway node or an end node, and each node in the set of interior nodes are activity nodes.

In one embodiment, the process model is divided into control regions according to the following steps. In a first step, a refined process structure tree (RPST) of the process model is generated, for example, using known techniques. In a second step, for each respective split gateway, a concurrency or exclusivity relationship is defined, based on the type of respective gateway, between all fragments of the RPST in which the respective gateway is the entry node. In a third step, a pre-order tree traversal is performed over the fragments of the RPST. During the traversal, concurrency and exclusivity relations of parent fragments are added to the current fragment to ensure concurrency and exclusivity relations based on ancestors are set. In a fourth step, a post-order tree traversal is performed over the fragments of the RPST initializing one or more control regions for every fragment. In this step, start and end nodes are considered gateway nodes. If a fragment is a leaf node of the RPST (i.e., it has no child fragments), a control region is initialized to include all edges in the fragment. If a fragment is not a leaf node of the RPST, consider all edges of the fragment that are not yet part of a control region. For each of such edges, if a gateway node is its source, a control region is initialized to include all edges between the source gateway node and a next gateway node. In a fifth step, successor relations between control regions are set. Successor relations are set based on the control regions that incoming and outgoing edges of the gateway node belong to. In accordance with an embodiment, every gateway is either splitting or joining (not both) and therefore, only the control regions corresponding to outgoing edges of splitting gateways and incoming edges for joining gateways need to be evaluated.

Figure 6:
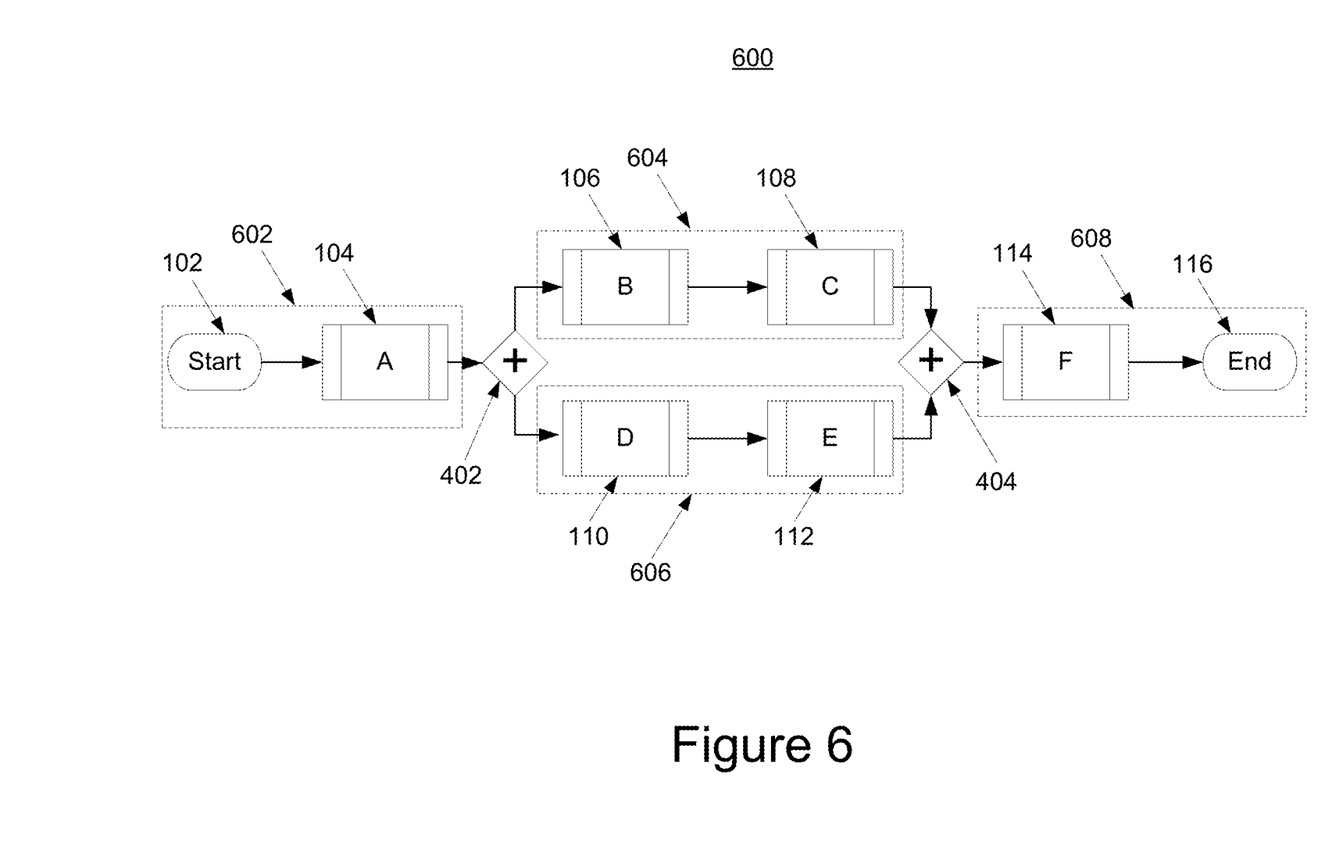
FIG. 6 shows an exemplary process model divided into a plurality of control regions, in accordance with one or more embodiments of the invention.

FIG. 6 shows an exemplary process model 600 divided into a plurality of control regions, in accordance with one or more embodiments. Process model 600 is the process model 400 (FIG. 4) of process 100 (FIG. 1), and will be shown and described with reference to FIGS. 1 and 4. As shown in FIG. 6, process model 600 is divided into control regions 602, 604, 606, and 608. Control regions 604 and 606 are parallel control regions. Control regions are parallel or exclusive control regions if they or one of their ancestors have the same parallel or exclusive split gateways, respectively.

At step 306 of FIG. 3, reachable nodes are determined for each particular node of the process model. As used herein, nodes of a process model are reachable from a particular node if the nodes are connected to the particular node through edges and/or gateways only, without traversing through activity nodes. For example, in process model 400 of FIG. 4, activity B 106 is reachable from activity A 104 and activity D 110 is reachable from activity A 104, however activity C 108 is not reachable from activity A 104 and activity B 106 is not reachable from activity D 110.

At step 308, a conformance of the process is determined by comparing transitions from source activities to destination activities in the event log with the reachable nodes. In some embodiments, the comparison may also be based on the control regions. In one embodiment, the conformance of the process is evaluated for each variant found in the event log. A variant refers to a unique sequence of activities. For each variant, the transitions of the variant are replayed or mapped onto the process model. While replaying the variant, each transition is mapped to the process model based on the structure of the process model (e.g., its control regions, concurrency, exclusivity, etc.) and the activities that have already been mapped while replaying the variant, and the mapped variant is rebuilt. If a transition can be mapped to the process model, the transitions are conforming transitions that occur in both the event log and the process model and are added to the mapped variant. If a transition cannot be mapped to the model, a log-only transition from the source activity to the destination activity is added. Behavior that is observed in the event log but not in the process model (log only behavior) and behavior that is not observed in the event log but is observed in the process model (model only behavior) are nonconforming.

For each transition from a source activity to a destination activity in a variant, one of the following situations occur:
  The source activity and/or the destination activity are not found in the process model: The transition represents nonconforming log only behavior.
  The transition exists directly in the process model: The transition conforms to the process model.
  The destination activity is reachable from the source activity: The transition conforms to the process model and the entire path from the source activity to the destination activity are conforming edges.
  The source activity and the destination activity have no direct relationship: Evaluate conformance based on the control region of the source activity and the destination activity. The source activity and the destination activity have no direct relationship if there is no direct transition between the activities in the model and the destination activity is not reachable from the source activity. One of the following situations occur:
    The control regions of the source activity and of the destination activity have an exclusive relationship: The transition represents nonconforming log only behavior.
    The control regions of the source activity and of the destination activity have a concurrent relationship: To handle parallelism, a variant σ replayed to the current activity is projected to track what event last occurred in a particular control region. A region projection $\sigma \bowtie \mathcal{R}_i$ of variant σ over control region $\mathcal{R}_i$ is the last event in variant σ that is mapped to an activity in the set of interior nodes of control region $\mathcal{R}_i$. If no event in variant σ is mapped to an activity in the set of interior nodes of control region $\mathcal{R}_i$, then the region projection $\sigma \bowtie \mathcal{R}_i$ is empty (i.e., $\sigma \bowtie \mathcal{R}_i = \emptyset$). If the destination activity is reachable from region projection $\sigma \bowtie \mathcal{R}_{destination}$ of variant σ over control region $\mathcal{R}_{destination}$ (the control region comprising the destination activity), the transition from $\sigma \bowtie \mathcal{R}_{destination}$ to the destination activity, or its entire path, is conforming. While the order of events in the event log may suggest there is a transition from the source activity to the destination activity, the actual transition is the found path (due to parallelism). If $\sigma \bowtie \mathcal{R}_{destination} = \emptyset$, conformance is evaluated based on the entry gateway of the control region of the destination activity $\mathcal{R}_{destination}$. If the destination activity is not reachable from its entry gateway, the transition from the source activity to the destination activity is nonconforming log only behavior. Otherwise, the transition from the entry gateway to the destination activity is conforming.
    The control regions of the source activity and of the destination activity have no direct relationship: The transition represents nonconforming log only behavior.

In one embodiment, if a transition is mapped from a parallel join gateway to a following activity or gateway, all proceeding paths (paths that end in the join gateway) are closed. This means that all concurrent control regions that end in this join gateway are looked at. For each of these control regions, it is determined whether the join gateway is reachable from the last executed activity in the control region. If so, that transition or path is added as conforming. If not, a log-only transition is added from the last executed activity in the control region to the above join gateway.

Once a variant has been completely replayed, all transitions in the model that have not been added as conforming transitions are evaluated. If those transitions are not required (i.e., they are part of an exclusive path), they are ignored. Otherwise, they are added to the mapped variant as model-only transitions.

At step 310, the conformance of the process is output. For example, the conformance of the process can be output by displaying the conformance of the process on a display device of a computer system, storing the conformance of the process on a memory or storage of a computer system, or by transmitting the conformance of the process to a remote computer system. In one embodiment, the conformance of the process is visualized by mapping variants of conforming and/or nonconforming transitions on the process model.

In one embodiment, the conformance of a process may be visualized using a nested model for visualization design. The nested model for visualization design includes the following four layers, where a lower layer is dependent on all layers above, from highest to lowest: i) characterization of the domain problem: describe the tasks and goals of target users in a particular domain; ii) data/operation abstraction design: abstracting from domain specific problems to generic descriptions of operations in the domain of information visualization; iii) encoding/interaction technique design:

designing interactions and visual encoding of information; and iv) algorithm design: create an algorithm to enact the interaction design and visual encoding automatically. Each layer will be discussed in further detail as follows.

Characterization of the domain problem: one problem includes an activity in the process model being skipped or an activity not in the process model being executed, which corresponds to log only behavior or model only behavior, respectively.

Data/operation abstraction design: in abstraction design, the user should be able to execute three different workflows in a simple and intuitive manner, with the first workflow being discovering observations, the second workflow being discovering observations, describing them, and finding attribute values that could be the cause, and the third workflow being discover observations, comparing them, and explaining their differences. To enable these three workflows, five different analysis goals should be supported in the visualization design: discover observation, describe observation (aggregate), identify main cause (aggregate) compare entities, and explain differences. Discover observation, which refers to finding specific deviations, is important as it is present in every workflow.

Figure 7:
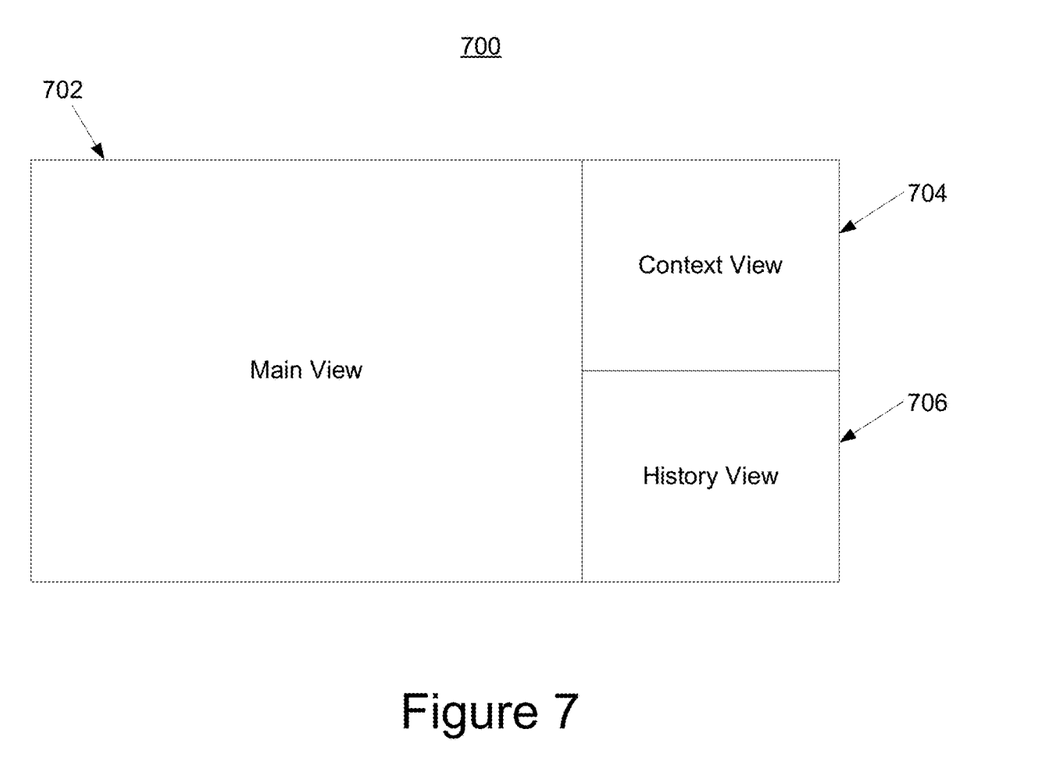
FIG. 7 shows a user interface of a multiple view system for showing an overall view of results of conformance checking, in accordance with one or more embodiments of the invention.
Figure 8:
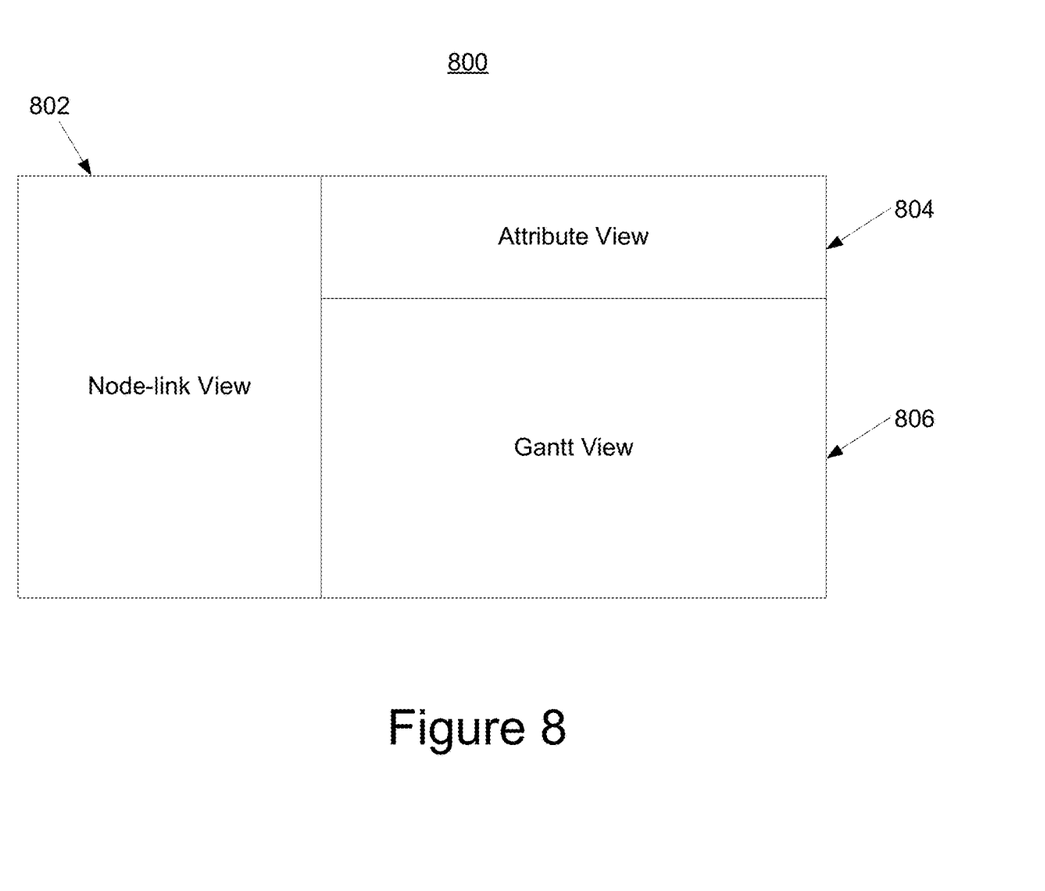
FIG. 8 shows a user interface of a multiple view system for showing a detailed view of results of conformance checking, in accordance with one or more embodiments of the invention.

Encoding/interaction technique design: Information has to be encoded for it to be effectively conveyed to the user. Furthermore, interaction allows users to change what information is displayed, allowing for many different queries. A multiple view system may be employed for the visualization of conformance. FIGS. 7 and 8 show examples of multiple view systems for the visualization of conformance, in accordance with one embodiment.

FIG. 7 shows a user interface 700 of a multiple view system for showing an overall view of results of conformance checking, in accordance with one or more embodiments. User interface 700 depicts aggregated information over multiple cases, and comprises a main view 702, a context view 704, and a history view 706. In one embodiment, main view 702 may be a node-link diagram showing conformance between the process model and the event log on the level of event transitions and events. Context view 704 shows information about conformance of variants or transitions in the event log. In one embodiment, context view 704 may depicts a bar chart with some default attributes visualized based on a selected aggregation level. Additional attributes may be added to the bar chart. History view 706 shows aggregated information about the conformance and frequency of variants, transitions, or events over time. In one embodiment, history view 706 includes one or more line graphs, which are also dependent on the selected aggregation level.

FIG. 8 shows a user interface 800 of a multiple view system for showing a detailed view of results of conformance checking, in accordance with one or more embodiments. User interface 800 shows information for a specific case. User interface 800 comprises node-link view 802 showing conformance between the process model and the event log on the level of event transitions and events, attribute view 804, and Gantt view 806.

Figure 9:
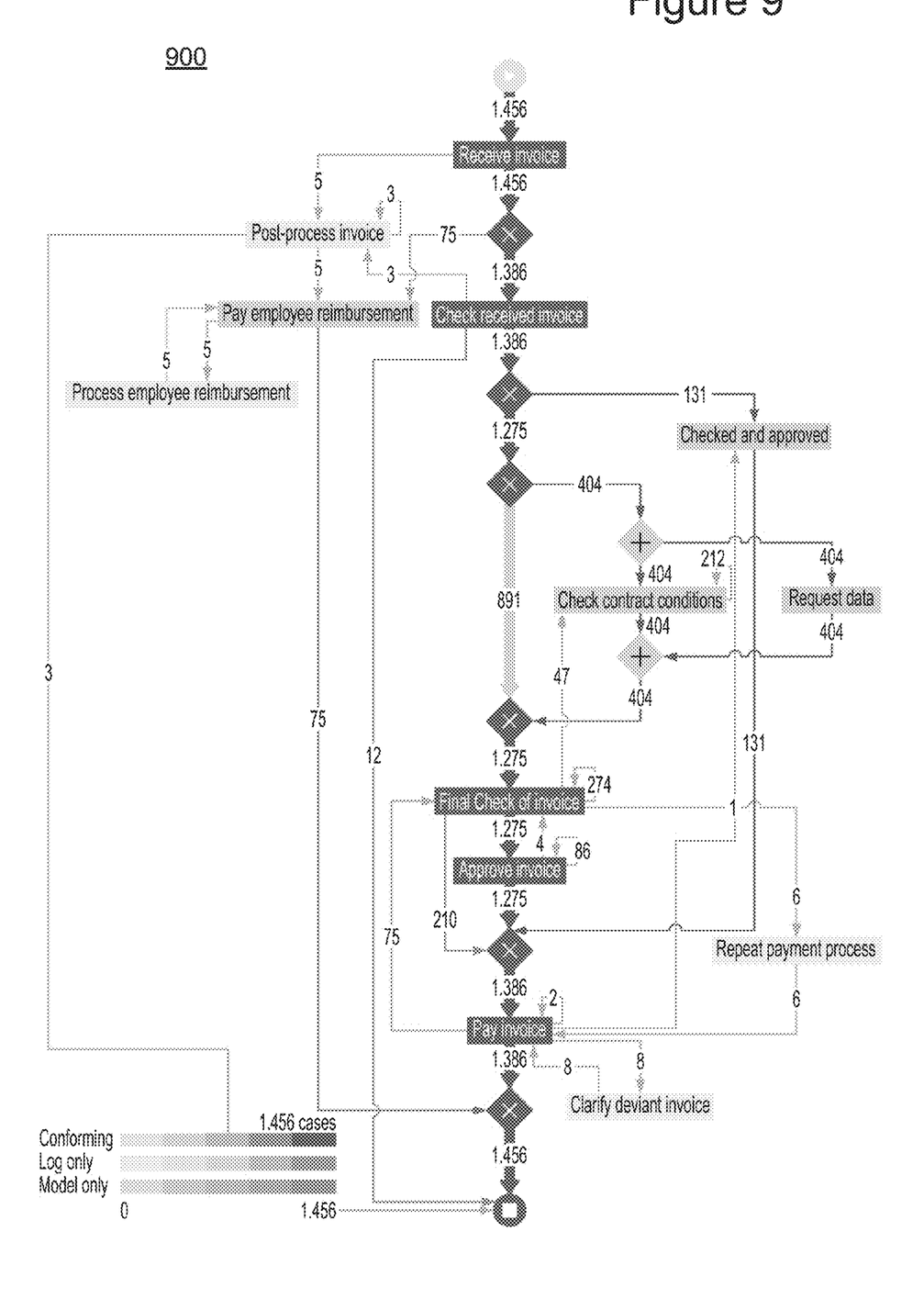
FIG. 9 shows a user interface showing an exemplary visualization of conformance, in accordance with one or more embodiments.

FIG. 9 shows a user interface 900 showing an exemplary visualization of conformance for an invoices data set mapped to a process model, and visualized in the visual conformance checking color mode of the process graph. The less frequent behavior was not modeled in the process model and shows up as log-only behavior.

Figure 10:
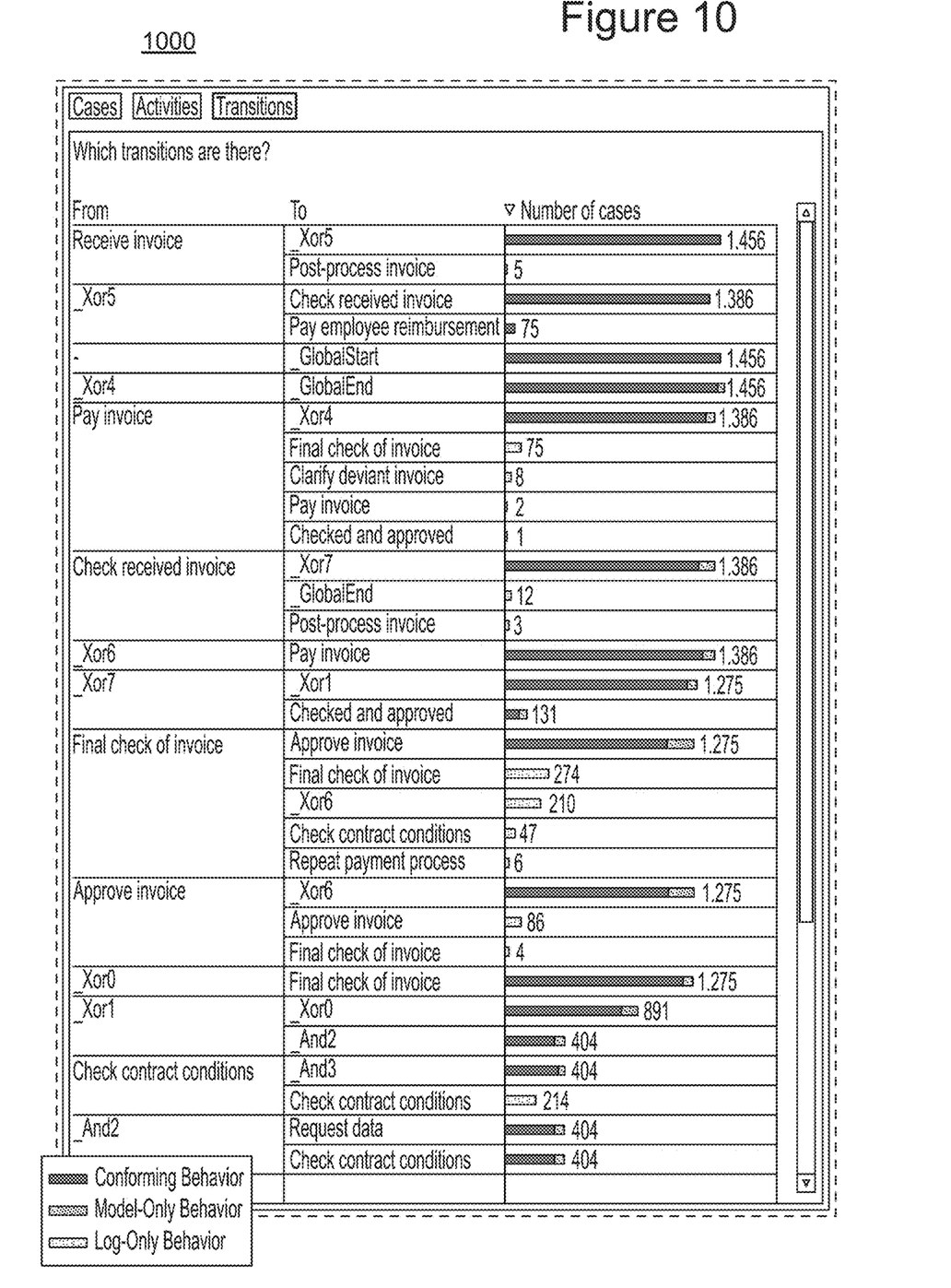
FIG. 10 shows a user interface showing exemplary results of conformance checking of transitions, in accordance with one or more embodiments.

FIG. 10 shows a user interface 1000 showing exemplary conformance information of transitions, in accordance with one or more embodiments. User interface 1000 shows the conformance information as bar charts. The currently selected metric is the number of events, which is used across all charts.

Figure 11:
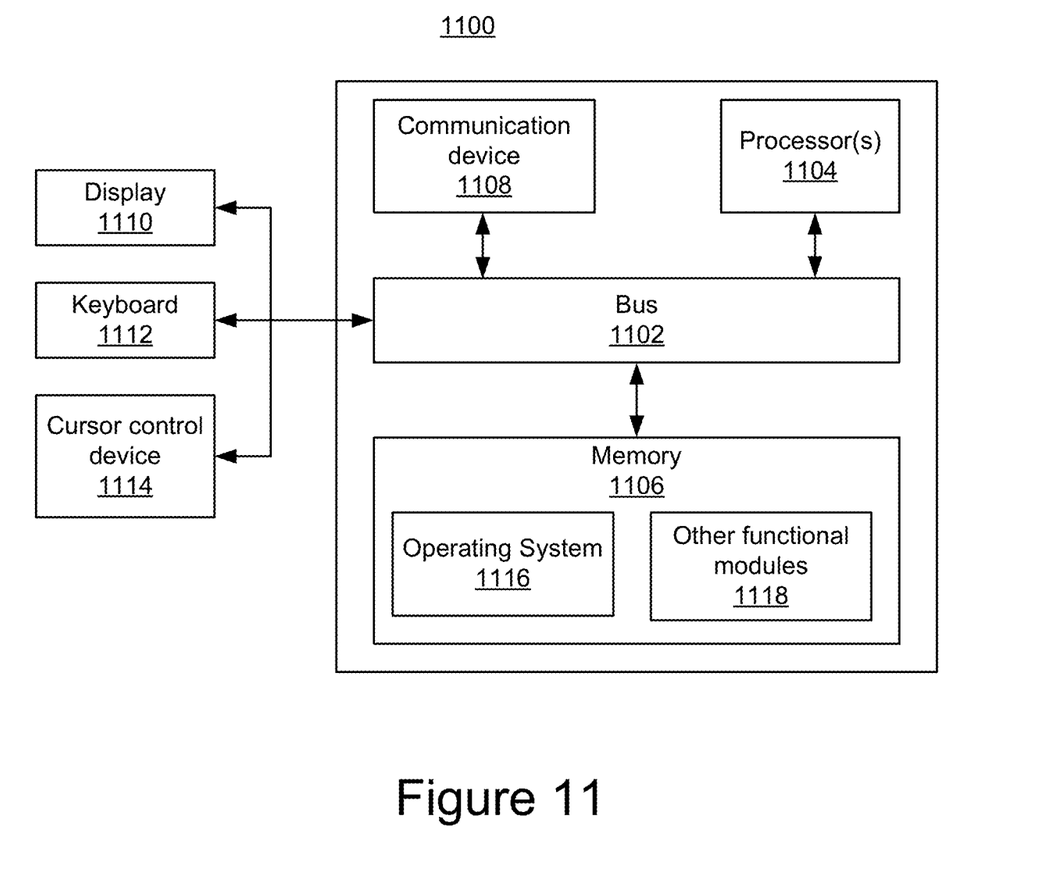
FIG. 11 is a block diagram of a computing system according to an embodiment of the invention.

FIG. 11 is a block diagram illustrating a computing system 1100 configured to execute the methods described in reference to FIGS. 2-3, according to an embodiment of the present invention. In some embodiments, computing system 1100 may be one or more of the computing systems depicted and/or described herein. Computing system 1100 includes a bus 1102 or other communication mechanism for communicating information, and processor(s) 1104 coupled to bus 1102 for processing information. Processor(s) 1104 may be any type of general or specific purpose processor, including a Central Processing Unit (CPU), an Application Specific Integrated Circuit (ASIC), a Field Programmable Gate Array (FPGA), a Graphics Processing Unit (GPU), multiple instances thereof, and/or any combination thereof. Processor(s) 1104 may also have multiple processing cores, and at least some of the cores may be configured to perform specific functions. Multi-parallel processing may be used in some embodiments.

Computing system 1100 further includes a memory 1106 for storing information and instructions to be executed by processor(s) 1104. Memory 1106 can be comprised of any combination of Random Access Memory (RAM), Read Only Memory (ROM), flash memory, cache, static storage such as a magnetic or optical disk, or any other types of non-transitory computer-readable media or combinations thereof. Non-transitory computer-readable media may be any available media that can be accessed by processor(s) 1104 and may include volatile media, non-volatile media, or both. The media may also be removable, non-removable, or both.

Additionally, computing system 1100 includes a communication device 1108, such as a transceiver, to provide access to a communications network via a wireless and/or wired connection according to any currently existing or future-implemented communications standard and/or protocol.

Processor(s) 1104 are further coupled via bus 1102 to a display 1110 that is suitable for displaying information to a user. Display 1110 may also be configured as a touch display and/or any suitable haptic I/O device.

A keyboard 1112 and a cursor control device 1114, such as a computer mouse, a touchpad, etc., are further coupled to bus 1102 to enable a user to interface with computing system. However, in certain embodiments, a physical keyboard and mouse may not be present, and the user may interact with the device solely through display 1110 and/or a touchpad (not shown). Any type and combination of input devices may be used as a matter of design choice. In certain embodiments, no physical input device and/or display is present. For instance, the user may interact with computing system 1100 remotely via another computing system in communication therewith, or computing system 1100 may operate autonomously.

Memory 1106 stores software modules that provide functionality when executed by processor(s) 1104. The modules include an operating system 1116 for computing system 1100 and one or more additional functional modules 1118 configured to perform all or part of the processes described herein or derivatives thereof.

One skilled in the art will appreciate that a "system" could be embodied as a server, an embedded computing system, a personal computer, a console, a personal digital assistant (PDA), a cell phone, a tablet computing device, a quantum computing system, or any other suitable computing device, or combination of devices without deviating from the scope of the invention. Presenting the above-described functions as being performed by a "system" is not intended to limit the scope of the present invention in any way, but is intended to provide one example of the many embodiments of the present invention. Indeed, methods, systems, and apparatuses disclosed herein may be implemented in localized and distributed forms consistent with computing technology, including cloud computing systems.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like. A module may also be at least partially implemented in software for execution by various types of processors. An identified unit of executable code may, for instance, include one or more physical or logical blocks of computer instructions that may, for instance, be organized as an object, procedure, or function. Nevertheless, the executables of an identified module need not be physically located together, but may include disparate instructions stored in different locations that, when joined logically together, comprise the module and achieve the stated purpose for the module. Further, modules may be stored on a computer-readable medium, which may be, for instance, a hard disk drive, flash device, RAM, tape, and/or any other such non-transitory computer-readable medium used to store data without deviating from the scope of the invention. Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The foregoing merely illustrates the principles of the disclosure. It will thus be appreciated that those skilled in the art will be able to devise various arrangements that, although not explicitly described or shown herein, embody the principles of the disclosure and are included within its spirit and scope. Furthermore, all examples and conditional language recited herein are principally intended to be only for pedagogical purposes to aid the reader in understanding the principles of the disclosure and the concepts contributed by the inventor to furthering the art, and are to be construed as being without limitation to such specifically recited examples and conditions. Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future.

What is claimed is:

1. A computer-implemented method comprising:
   executing a robotic process automation (RPA) process by one or more RPA robots;
   receiving an event log of the execution, the event log including source activities and destination activities;
   receiving a process model representing an expected execution of the RPA process, the process model including a plurality of nodes and one or more control regions, wherein:
      reachable nodes for each respective node in the process model are nodes of the plurality of nodes connected to the respective node through one or more edges and/or one or more gateways only without being connected through any intervening activity nodes of the plurality of nodes in the process model; and
      conformance of the RPA process to the process model is based on transitions from the source activities to the destination activities in the event log, the reachable nodes, and the one or more control regions; and
   displaying the conformance of the RPA process to the process model on a display device.

2. The computer-implemented method of claim 1, wherein the conformance indicates that the RPA process does not conform to the process model when a control region of at least one source activity and a control region of at least one destination activity have an exclusive relationship.

3. The computer-implemented method of claim 1, wherein the conformance is further based on a transition from a last activity to a destination activity when the destination activity is reachable from the last activity executed in a control region of the destination activity.

4. The computer-implemented method of claim 1, wherein the conformance is further based on a transition from a source activity to a destination activity when no activity is executed in a control region of the destination activity and the destination activity is reachable from an entry gateway of the control region of the destination activity.

5. The computer-implemented method of claim 1, wherein the process model models the RPA process using parallel and/or exclusive gateways to represent diversions in the RPA process.

6. The computer-implemented method of claim 1, wherein the conformance indicates that the RPA process conforms to the process model when at least one destination activity is reachable from at least one source activity.

7. The computer-implemented method of claim 1, wherein a control region is a region of the process model that has a single entry node, a single exit node, and a set of interior nodes, and wherein the entry node is a gateway node or a start node, the exit node is a gateway or an end node, and each node in the set of interior nodes are activity nodes.

8. An apparatus comprising:
   a memory storing computer instructions; and
   at least one processor configured to execute the computer instructions, the computer instructions configured to cause the at least one processor to perform operations of:
      executing a robotic process automation (RPA) process by one or more RPA robots;
      receiving an event log of the execution, the event log including source activities and destination activities;
      receiving a process model representing an expected execution of the RPA process, the process model including a plurality of nodes and one or more control regions, wherein:
         reachable nodes for each respective node in the process model are nodes of the plurality of nodes connected to the respective node through one or more edges and/or one or more gateways only without being connected through any intervening activity nodes of the plurality of nodes in the process model; and conformance of the RPA process to the process model is based on transitions from the source activities to the destination activities in the event log, the reachable nodes, and the one or more control regions; and displaying the conformance of the RPA process to the process model on a display device.

9. The apparatus of claim 8, wherein the conformance indicates that the RPA process conforms to the process model when at least one destination activity is reachable from at least one source activity.

10. The apparatus of claim 8, wherein the conformance indicates that the RPA process does not conform to the process model when a control region of at least one source activity and a control region of at least one destination activity have an exclusive relationship.

11. The apparatus of claim 8, wherein the conformance is further based on a transition from a last activity to a destination activity when the destination activity is reachable from the last activity executed in a control region of the destination activity.

12. The apparatus of claim 8, wherein the conformance is further based on a transition from a source activity to a destination activity when no activity is executed in a control region of the destination activity and the destination activity is reachable from an entry gateway of the control region of the destination activity.

13. The apparatus of claim 8, wherein the process model models the RPA process using parallel and/or exclusive gateways to represent diversions in the RPA process.

14. The apparatus of claim 8, wherein a control region is a region of the process model that has a single entry node, a single exit node, and a set of interior nodes, and wherein the entry node is a gateway node or a start node, the exit node is a gateway or an end node, and each node in the set of interior nodes are activity nodes.

15. A non-transitory computer-readable medium excluding transitory signals storing computer program instructions, the computer program instructions, when executed on at least one processor, cause the at least one processor to perform operations comprising:

executing a robotic process automation (RPA) process by one or more RPA robots;

receiving an event log of the execution, the event log including source activities and destination activities;

receiving a process model representing an expected execution of the RPA process, the process model including a plurality of nodes and one or more control regions, wherein:

reachable nodes for each respective node in the process model are nodes of the plurality of nodes connected to the respective node through one or more edges and/or one or more gateways only without being connected through any intervening activity nodes of the plurality of nodes in the process model; and conformance of the RPA process to the process model is based on transitions from the source activities to the destination activities in the event log, the reachable nodes, and the one or more control regions; and displaying the conformance of the RPA process to the process model on a display device.

16. The non-transitory computer-readable medium of claim 15, wherein the conformance indicates that the RPA process conforms to the process model when at least one destination activity is reachable from at least one source activity.

17. The non-transitory computer-readable medium of claim 15, wherein the conformance indicates that the RPA process does not conform to the process model when a control region of at least one source activity and a control region of at least one destination activity have an exclusive relationship.

18. The non-transitory computer-readable medium of claim 15, wherein the conformance is further based on a transition from a last activity to a destination activity when the destination activity is reachable from the last activity executed in a control region of the destination activity.

19. The non-transitory computer-readable medium of claim 15, wherein the conformance is further based on a transition from a source activity to a destination activity when no activity is executed in a control region of the destination activity and the destination activity is reachable from an entry gateway of the control region of the destination activity.

20. The non-transitory computer-readable medium of claim 15, wherein a control region is a region of the process model that has a single entry node, a single exit node, and a set of interior nodes, and wherein the entry node is a gateway node or a start node, the exit node is a gateway or an end node, and each node in the set of interior nodes are activity nodes.

* * * * *